United States Patent
Alshaheen

(10) Patent No.: US 9,585,377 B1
(45) Date of Patent: Mar. 7, 2017

(54) FENCING APPARATUS AND SYSTEM

(71) Applicant: Ratio Engineering LLC, Brooklyn, NY (US)

(72) Inventor: Khaled Ibrahim Alshaheen, Kuwait (KW)

(73) Assignee: Ratio Engineering LLC

( * ) Notice: Subject to any disclaimer, the term of this patent is extended or adjusted under 35 U.S.C. 154(b) by 0 days.

(21) Appl. No.: 15/200,118

(22) Filed: Jul. 1, 2016

Related U.S. Application Data

(60) Provisional application No. 62/351,007, filed on Jun. 16, 2016.

(51) Int. Cl.
| | | |
|---|---|---|
| *A01M 29/24* | (2011.01) | |
| *H05K 5/00* | (2006.01) | |
| *H05K 5/02* | (2006.01) | |
| *H05C 1/04* | (2006.01) | |

(52) U.S. Cl.
CPC ............ *A01M 29/24* (2013.01); *H05C 1/04* (2013.01); *H05K 5/0017* (2013.01); *H05K 5/0026* (2013.01); *H05K 5/0247* (2013.01)

(58) Field of Classification Search
CPC ...... A01M 29/24; A01M 29/26; A01M 29/28; Y10T 307/766
USPC ............................. 361/232; 307/116; 43/98
See application file for complete search history.

(56) References Cited

U.S. PATENT DOCUMENTS

| | | | |
|---|---|---|---|
| 4,562,561 A | 12/1985 | Ackley | |
| 4,949,216 A | 8/1990 | Djukastein | |
| 5,265,371 A * | 11/1993 | McCuistion, III | .... A01M 23/06 43/70 |
| 5,850,808 A * | 12/1998 | Burdick | ............... A01M 29/26 119/713 |
| 6,283,064 B1 | 9/2001 | Djukastein et al. | |
| 6,519,131 B1 | 2/2003 | Beck | |
| 6,836,999 B2 * | 1/2005 | Rich | ..................... A01M 23/38 43/98 |
| 6,948,452 B2 | 9/2005 | Wolfgram | |
| 7,299,586 B2 * | 11/2007 | Lawson, Jr. | .......... A01M 29/24 43/98 |
| 8,430,063 B1 | 4/2013 | Riddell | |
| 8,733,014 B2 | 5/2014 | Donoho | |
| 9,192,153 B2 | 11/2015 | Riddell | |
| 2008/0028668 A1* | 2/2008 | Pollman | ................ A01M 29/28 361/232 |

(Continued)

*Primary Examiner* — Fritz M Fleming
(74) *Attorney, Agent, or Firm* — Depeng Bi; Law Offices of Konrad Sherinian

(57) ABSTRACT

A fencing system for deterring an animal from entering a facility includes a control box, a fencing base controlled by the control box, and a conduit cable connecting the control box and the fencing base. The control box includes a power supply, a generator board, a transformer and a grid load resistance detector. The generator board produces electrical wave form transformed by the transformer. The transformer connects to two connection braces of the fencing base. The control box operates in an active mode and a halted mode depending the grid load resistance and duration of the load resistance. The fencing base includes a set of fence tracks forming the grid and connected to the connection braces in an alternating style. The control box also supports more than one fencing base. The more than one fencing base can take different shapes and be extended in length to fit facility openings of different sizes.

15 Claims, 15 Drawing Sheets

(56) References Cited

U.S. PATENT DOCUMENTS

| | | | |
|---|---|---|---|
| 2009/0309738 A1* | 12/2009 | Hinkle | A01M 29/24 340/573.3 |
| 2011/0214339 A1* | 9/2011 | Donoho | A01M 23/38 43/98 |
| 2012/0127624 A1* | 5/2012 | Ritson | A01M 29/26 361/232 |
| 2013/0058000 A1* | 3/2013 | Kaps | H05C 1/00 361/232 |

* cited by examiner

504

506

FENCING APPARATUS AND SYSTEM

CROSS REFERENCE TO RELATED APPLICATIONS

This application claims the benefit and priority of U.S. Patent Application No. 62/351,007, entitled "FENCING APPARATUS AND SYSTEM," filed Jun. 16, 2016, which is hereby incorporated by reference in its entirety.

FIELD OF THE DISCLOSURE

The present invention generally relates to animal deterrent devices, and more particularly relates to an electric fencing system operating in active and halted states for repelling animals from entering a facility. More particularly still, the present disclosure relates to an electric fencing system operating in active and halted states based on load resistance and time duration for repelling animals from entering a facility.

DESCRIPTION OF BACKGROUND

Both commercial and residential facilities attract rodents, pests and other types of animals (collectively referred to herein as animals). For example, food storage facilities oftentimes attract various animals foraging for food. As an additional example, warehouses oftentimes attract animals seeking shelters. The animals get inside the facilities through openings, such as doors, windows, gates and other types of pathways.

Various solutions have been proposed to keep animals from facilities. For example, U.S. Pat. No. 6,519,131 proposes an electric cattle guard that produces periodic pulses at about one second intervals. Each pulse lasts about 150 microseconds. U.S. Pat. No. 9,192,153 discloses an electric deterrent device that generates an electric shock to prevent animals from entering a facility. U.S. Pat. No. 6,948,452 teaches an electric animal deterrent device that includes a high voltage pulse generator. The high voltage is approximately 1000 to 3000 Volts AC. U.S. Pat. No. 8,430,063 proposes a particular structure of an animal deterrent device with insulated fasteners. U.S. Pat. No. 8,733,014 teaches an electric deterrent device having knitted conductors in a specialized structure. U.S. Pat. No. 4,949,216 suggests an apparatus for discouraging animals from a selected area. The apparatus includes a mat and a control generating a series of electrical pulses to a conductive surface of the mat. The pulses are spaced by about one second.

Each of the conventional animal deterrent devices has certain drawbacks. To protect establishments, warehouses, food banks and other types of facilities from animals, an extensible electric animal deterrent device is desired for fitting to different sizes of facilities. In addition, a long-lasting, easy to install and low maintenance animal deterrent device is desired. Furthermore, an animal deterrent device utilizing low voltage of electrical shock for protecting animals is more desired. Moreover, an animal deterrent device in a loop shape is desired for certain applications, such as an installation of the device around a window.

Accordingly, there is a need for a new type of animal fencing system incorporating an extensible base. The new fencing system operates in active and halted modes based on load resistance and duration of time.

OBJECTS OF THE DISCLOSED SYSTEM, METHOD, AND APPARATUS

Accordingly, it is an object of this disclosure to provide an electrical fencing system protecting facilities from animals.

Another object of this disclosure is to provide an electrical fencing system with an extensible fencing base.

Another object of this disclosure is to provide an electrical fencing system with more than one fencing base.

Another object of this disclosure is to provide an electrical fencing system with more than one extensible fencing base.

Another object of this disclosure is to provide an electrical fencing system producing low voltage electrical shocks for protecting the health of animals and humans.

Another object of this disclosure is to provide an electrical fencing system with a control box operating in active and halted pulsation operations.

Another object of this disclosure is to provide an electrical fencing system with a control box including a power supply, a generator board, a transformer and a load detector.

Another object of this disclosure is to provide an electrical fencing system with a control box producing triangular electrical wave form.

Another object of this disclosure is to provide an electrical fencing system with a fencing base incorporating a set of fence tracks.

Another object of this disclosure is to provide an electrical fencing system with a fencing base incorporating two alternating subsets of fence tracks connected to two respective connection braces.

Another object of this disclosure is to provide an electrical fencing system with a fencing base incorporating a set of fence tracks.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a fencing system for keeping animals away from facilities, such as warehouses and food banks. The electrical fencing system includes a control box, a fencing base and a conduit cable linking the control box and the fencing base. The control box is mounted to, for example, a wall on one side of a pathway (such as a door, a window, a gate, etc.) while the fencing base is disposed around or along the pathway. The control box includes power supply unit, such as an AC to DC converter, a pulse generator board generating electrical wave form in triangular shape, a transformer transforming the wave form and connecting to the fencing base. The control box also includes a load resistance detector for determining the resistance of a grid formed by a set of fencing tracks of the fencing base. Depending on the detected resistance and the duration of the resistance, the control box operates in an active pulsation operation or a halted pulsation operation.

The fencing base includes two connection braces operatively coupled to two alternating subsets of fencing tracks respectively. The connection braces are electrically connected to the transformer. The connection can be split in parallel for the control box to control multiple fencing bases. The fencing base also includes a pad rail incorporating a set of grooves receiving the set of fencing tracks. The set of fencing tracks is firmly coupled to the set of grooves.

The fencing base includes multiple extension connectors for extend the base in length. The fencing base further includes an end cap set including an end cap base and an end cap attached to the end cap base. The end cap covers one end of the pad rail and the fencing tracks. The fencing base also includes a distributor cap connecting the conduit cable and covering the other end of the pad rail and the fencing tracks.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
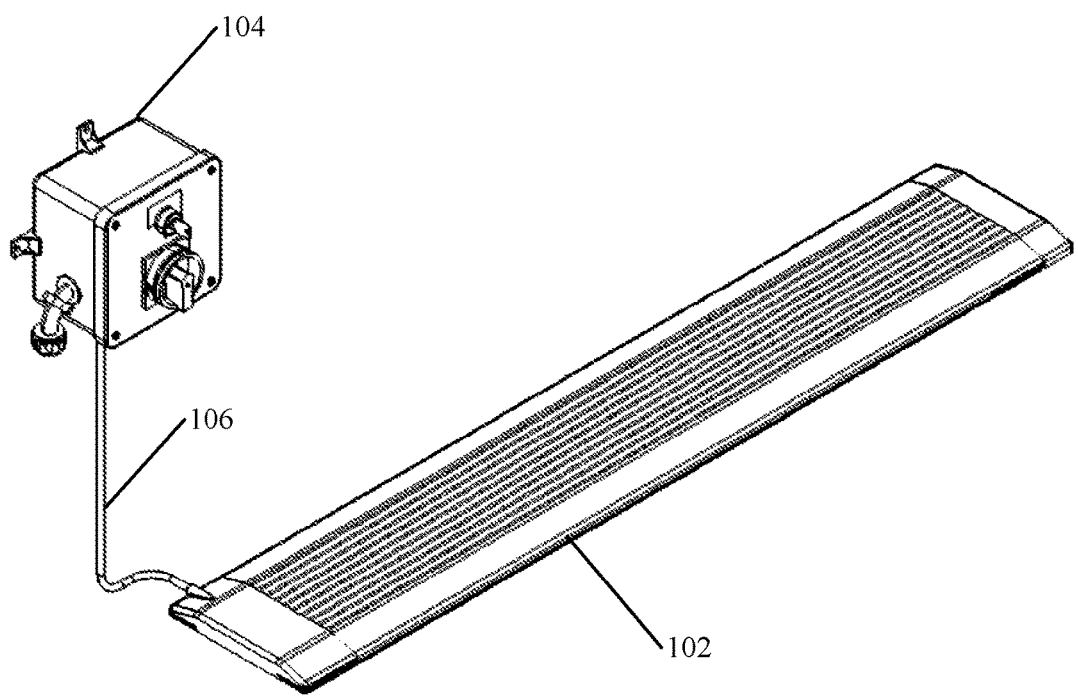
FIG. 1 is a block diagram of an active fencing system in accordance with this disclosure.
Figure 2:
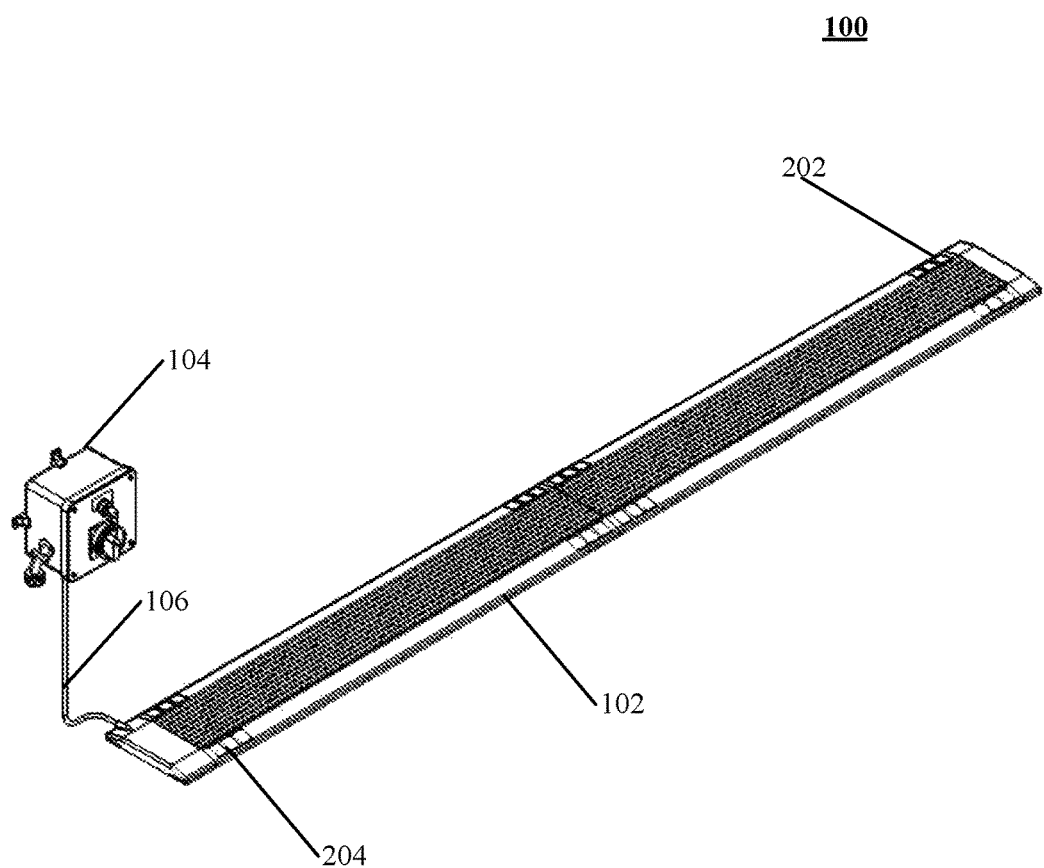
FIG. 2 is a block diagram of an extensible active fencing system in accordance with this disclosure.

Turning to the Figures and to FIG. 1 in particular, a fencing apparatus and system is shown and generally indicated at 100. The illustrative fencing system 100 includes a base 102 placed on the ground in front of an entrance of a facility, a control box 104 and a conduit cable 106 operatively coupling the fencing base 102 to the control box 104. In one implementation, the floor mat 102 is extensible as shown in FIG. 2. Referring to FIG. 2, floor mat extensions 202 and 204 are installed to the two ends and form part of the fencing base 102. The adjustable base 102 allows the fencing system 100 to be used with facilities having doors (or other types of openings, such as windows) of different dimensions. For example, with a length of twenty five feet, the adjustable base 102 can be applied to a wide warehouse door.

The fencing base 102 includes an electrically conductive metal grid at the top of its surface for creating an electrified boundary. The grid is powered and controlled by the control box 104 tethered to the base 102 via the connection 106. The control box 104 keeps the grid electrically charged in alternating high and low sequenced electrical wave pulsation. In one implementation, the electrical pulses are no more than 12 milliamperes regardless of the load resistance the grid is subjected to, and in a triangular alternating waveform of ninety-two (92) Volts. The ninety-two Volts is a peak-to-peak measurement of the waveform with common ground being at center. The electrical pulses are transmitted through a trespassing animal's limbs as it touches two or more grid lines (also referred to herein as fence tracks). The electrical discharge is not lethal and does not hurt the health of animals and humans.

Figure 3:
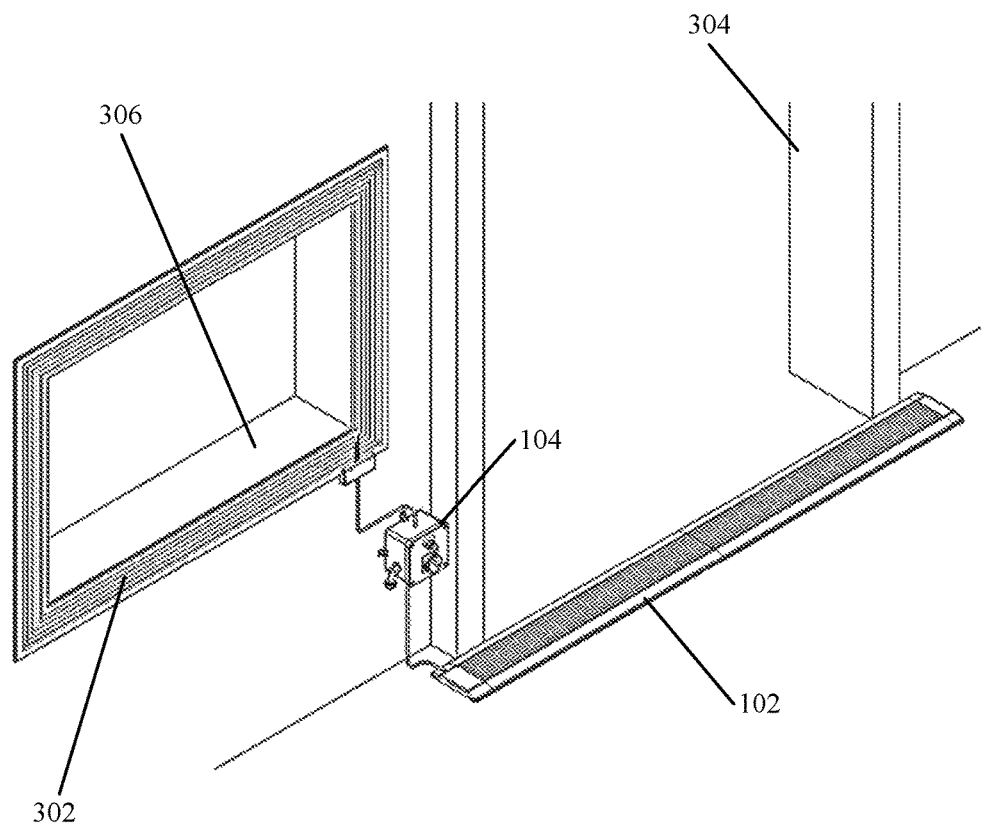
FIG. 3 is a perspective view of an application of an active fencing system including more than one fencing base in accordance with the teachings of this disclosure.

In one implementation, the control box 104 is configured to connect to one fencing base, such as the floor mat 102. In a further implementation, the control box 104 is configured to connect to more than one fencing bases. An illustration of the latter implementation is shown by reference to FIG. 3. Referring to FIG. 3, a perspective view of an application of the fencing system 100 is shown. The control box 104 is mounted to a wall of a facility having a door 304 and a window 306. The fencing base 102 is positioned on the ground and extends along the entire width of the door 304. A different fencing base 302 is placed on the window 306 and extends along the entire perimeter of the window 306. The fencing base 302 is in an enclosed loop shape. Both the extension 102 and the extension 302 are connected to the same control box 104 using conduit cables, including the conduit cable 106.

Figure 4:
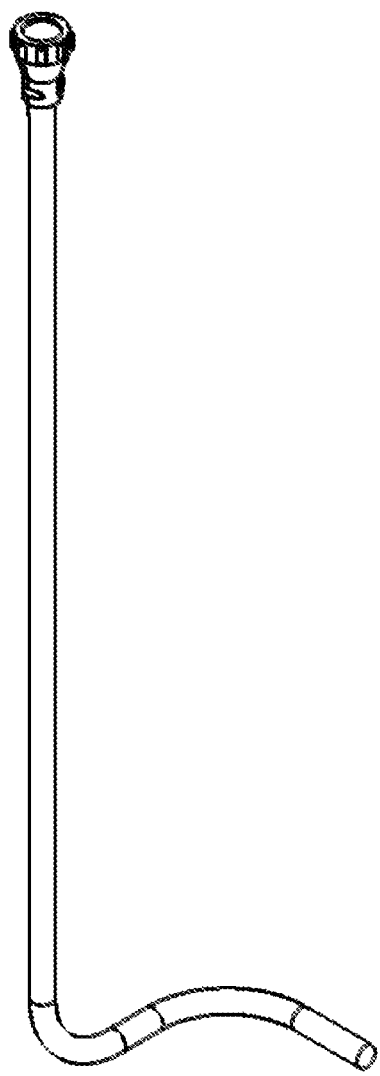
FIG. 4 is a perspective view of a conduit cable connecting a control box and a fencing base in accordance with this disclosure.

The conduit cable 106 is further illustrated by reference to FIG. 4, which shows the cable 106 without operatively coupled to the fencing base 102 or the control box 104. In one implementation, the conduit cable 106 includes a flexible hose housing electrical cables linking the floor mat 102 to the control box 104.

Figure 5:
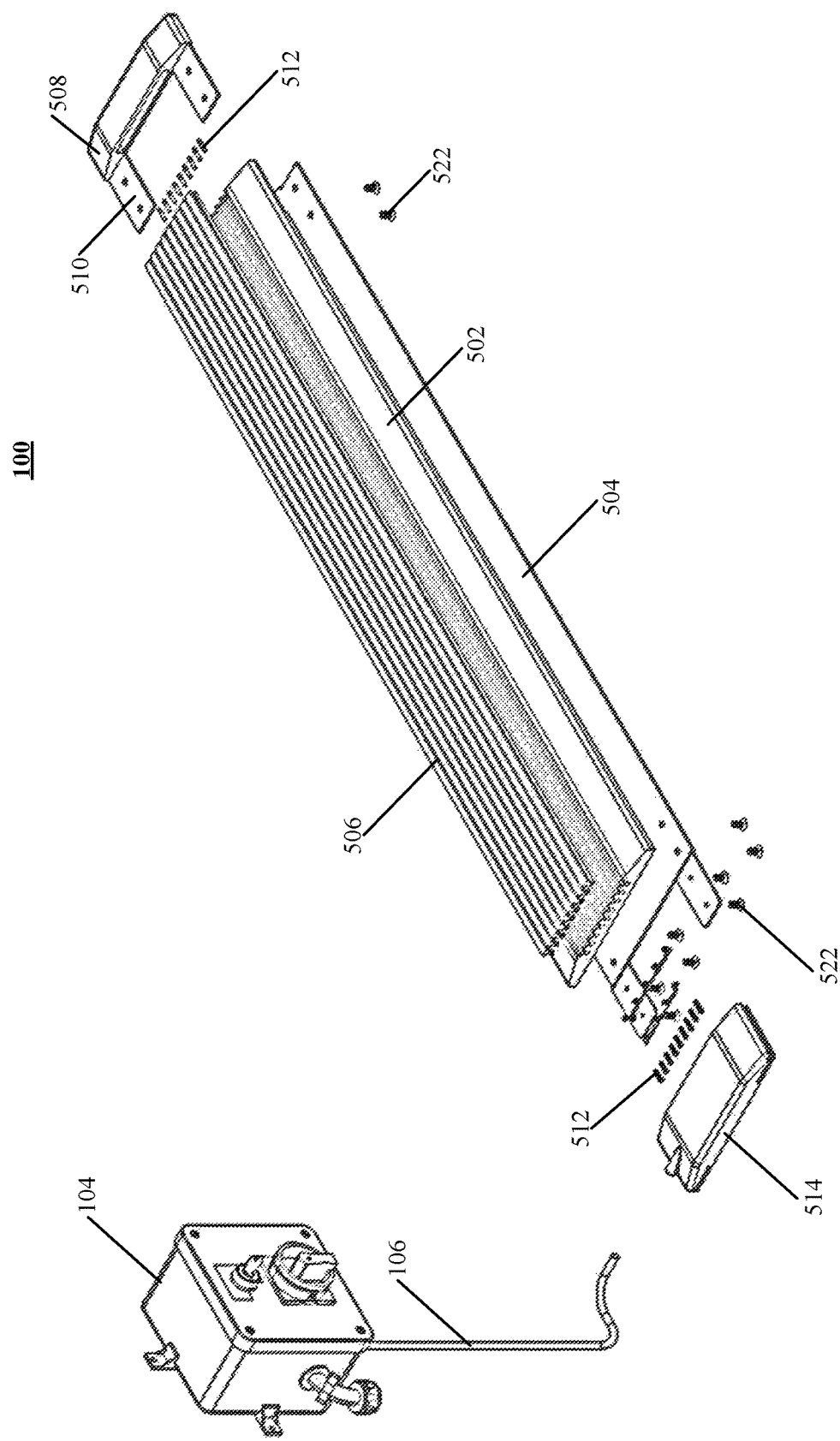
FIG. 5 is an exploded view of a fencing system in accordance with the teachings of this disclosure.
Figure 6:
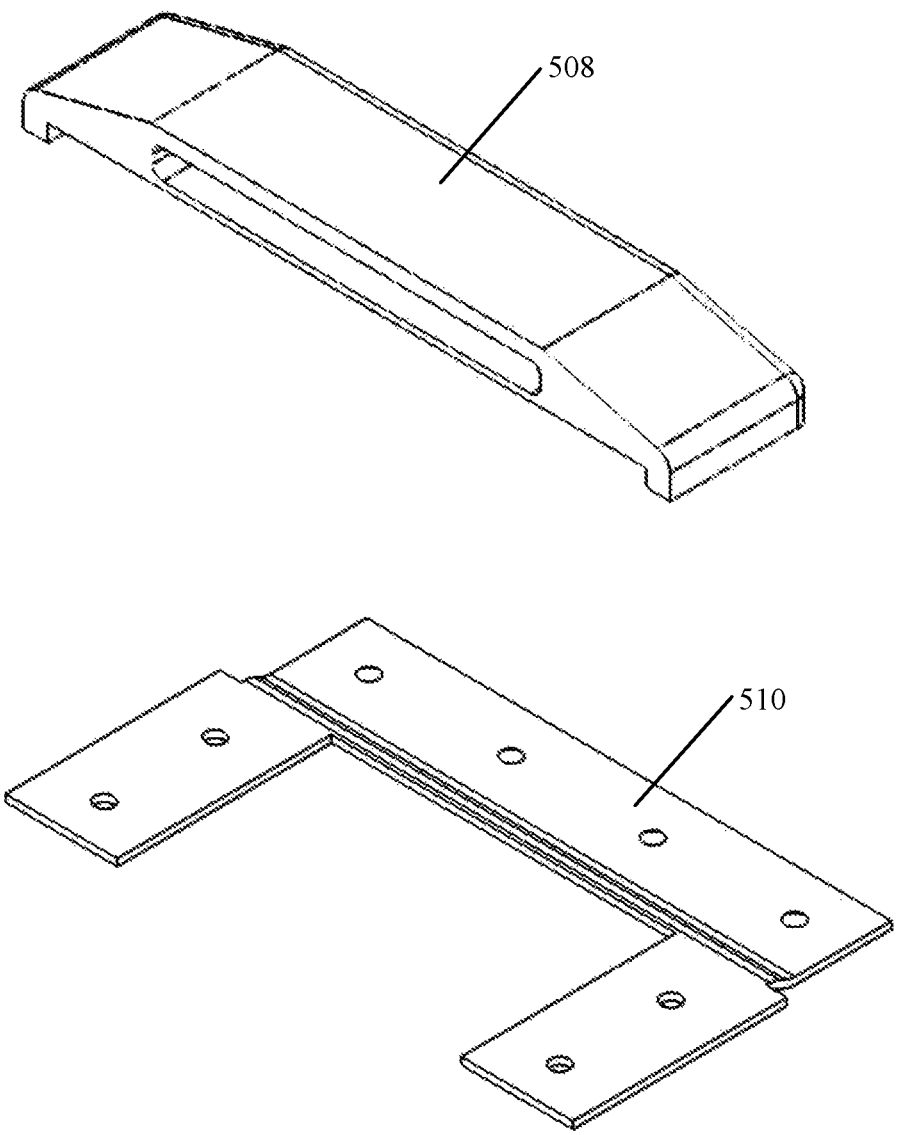
FIG. 6 is a perspective view of an end cap and an end cap base in accordance with the teachings of this disclosure.

An exploded view of the fencing system 100 is shown in FIG. 5. Turning to FIG. 5 now, the extension 102 includes an end cap assembly including an end cap 508 and an end cap base 510. The end cap 508 is attached to the end cap base 510. The end cap 508 is made of, for example, high strength and high impact resistance polymer. The end cap base 510 is made of, for example, high tensile strength aluminum or steel. The end cap 508 and the end cap base 510 are further illustrated in FIG. 6.

Figure 7:
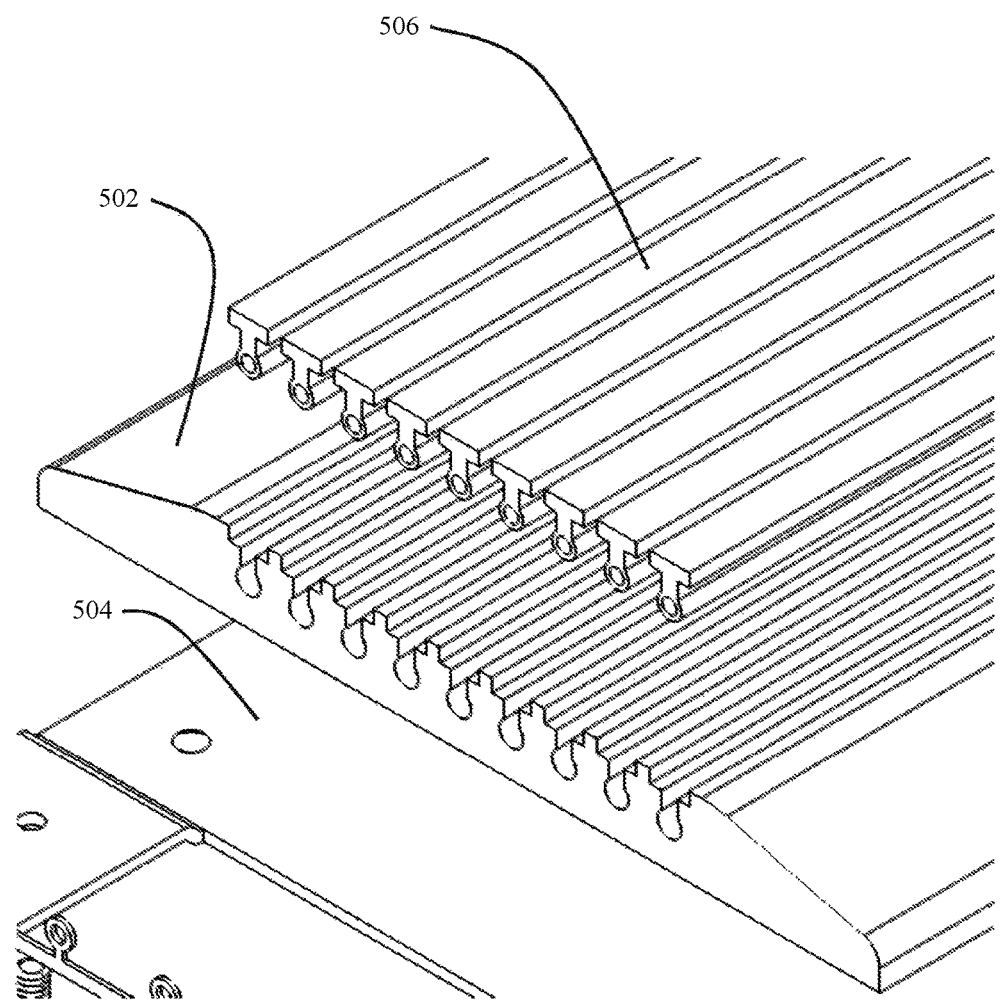
FIG. 7 an exploded view of a fencing base in accordance with the teachings of this disclosure.
Figure 11:
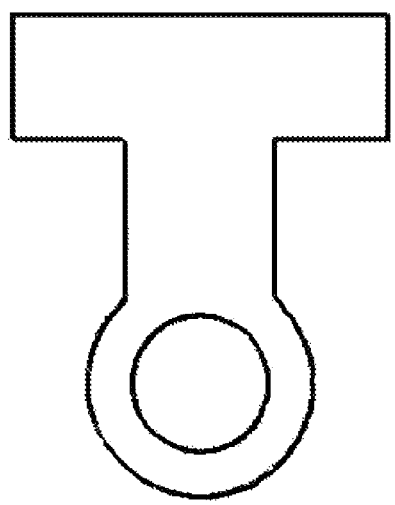
FIG. 11 is a cross-sectional view of a fence track in accordance with the teachings of this disclosure.

Turning back to FIG. 5, the fencing base 102 further includes a pad rail 502, a rail base 504, and a set (meaning one or more) of fence tracks 506. Parts of the base 102 are operatively coupled together using a set of screws 522. The fence tracks 506 are operatively coupled to the pad rail 502, and are electrically conductive. They are made of materials of low resistance, such as metal, conductive tape, conductive rubber or plastic. The pad rail 502 is attached to the rail base 504 using, for example, screws 522. In one implementation, the pad rail 502 is made of, for example, high strength and high impact resistance clear polymer to house electrode fence tracks 506. The fence tracks 506 form an electrically conductive grid. An exploded view of the pad rail 502, the rail base 504, and the fence tracks 506 is further illustrated by reference to FIG. 7. The pad rail 502 incorporates a set of grooves for receiving the set of fence tracks 506. The geometric shape of the grooves matches that of the fence tracks 506. A cross-sectional view of the fence track 506 is shown in FIG. 11.

Figure 9:
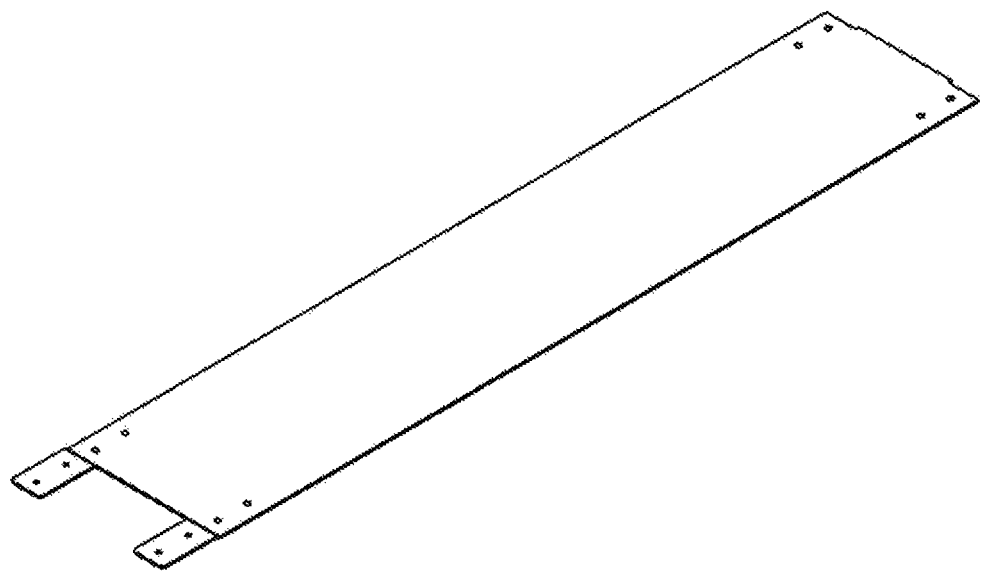
FIG. 9 is a perspective view of a rail base of a fencing base in accordance with the teachings of this disclosure.

The rail base 504 is further illustrated in FIG. 9. In one embodiment, the rail base 504 is made of mill finish high tensile strength aluminum or steel.

Figure 8:
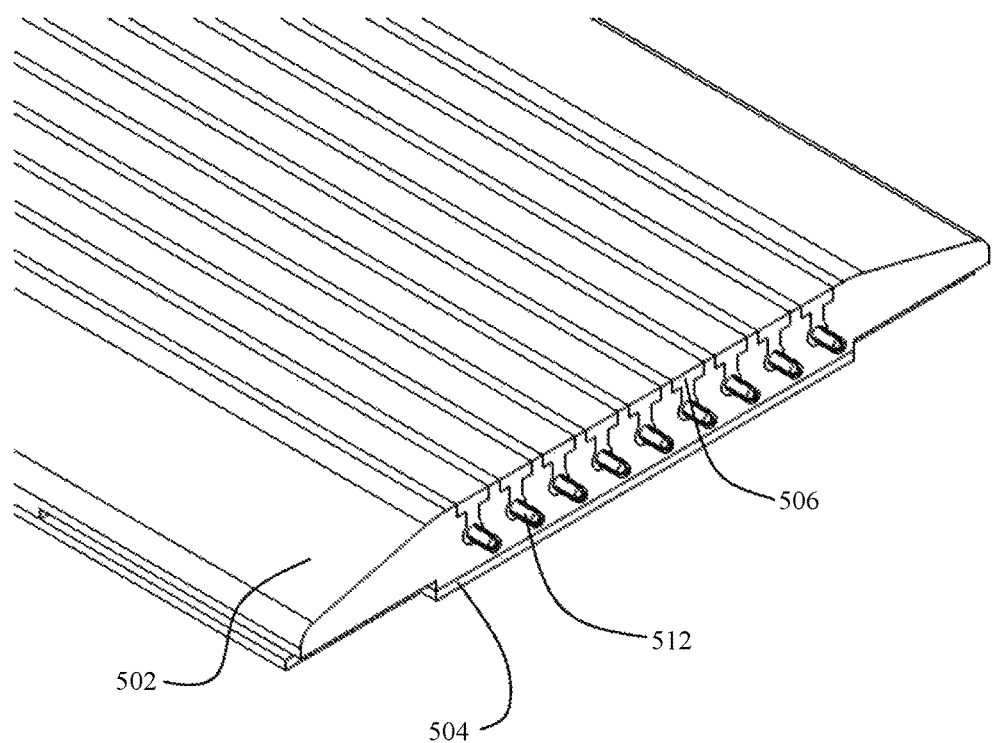
FIG. 8 is a cut-away view of a fencing base in accordance with the teachings of this disclosure.
Figure 10:
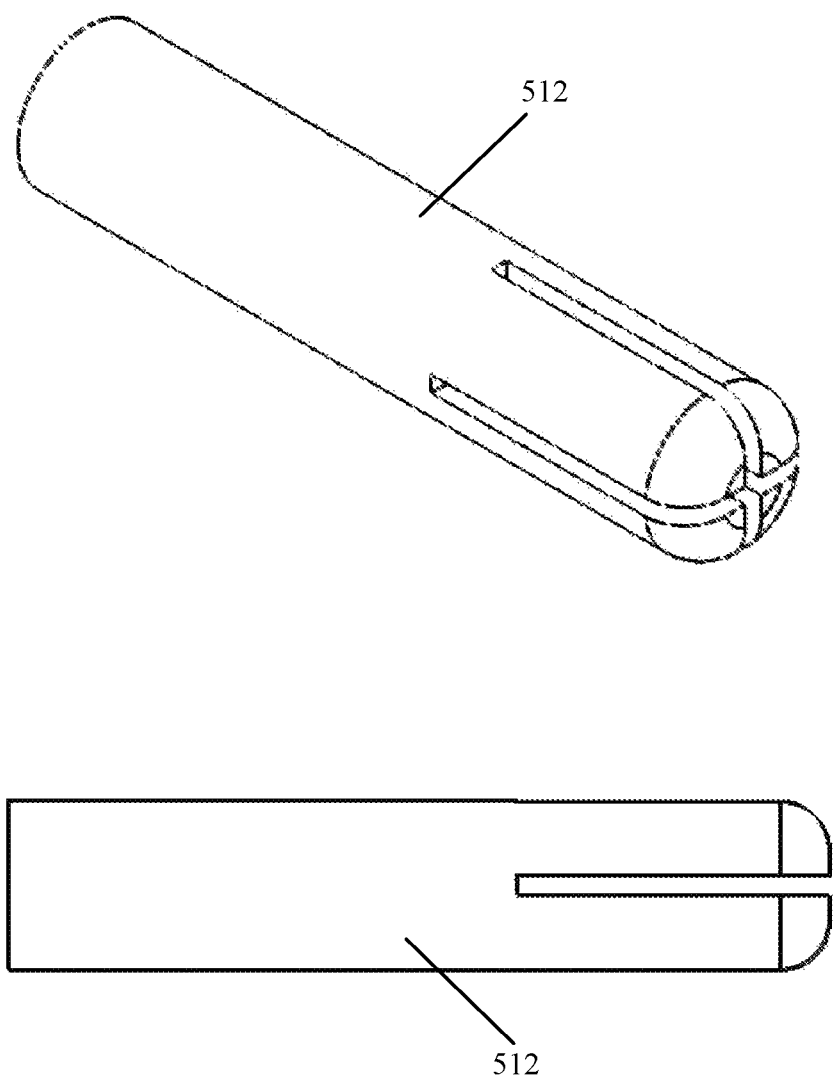
FIG. 10 is a perspective view along with a side view of a fence track in accordance with the teachings of this disclosure.

The end cap assembly and the fence tracks 506 are attached to the pad rail 502 using a set of extension connectors 512. A cut-away view of attachment mechanism is further illustrated by reference to FIG. 8. A perspective view and a side view of the extension connector 512 are shown in FIG. 10 respectively. The extension connectors 512 extend the fence track signals to additional tracks. In one embodiment, they are spring tempered and made of anti-corrosion nickel plated brass.

Turning back to FIG. 5, the fencing base 102 also includes a distributor cap 514 connecting to the conduit cable 106 and attached to the pad rail 502 via the extension connectors 512. The distributor cap 514 is made of, for example, high strength and impact resistance polymer. The distributor cap 514 and the end cap 508 cover two respective ends of the rail base 504, pad rail 502 and fence tracks 506.

Figure 12:
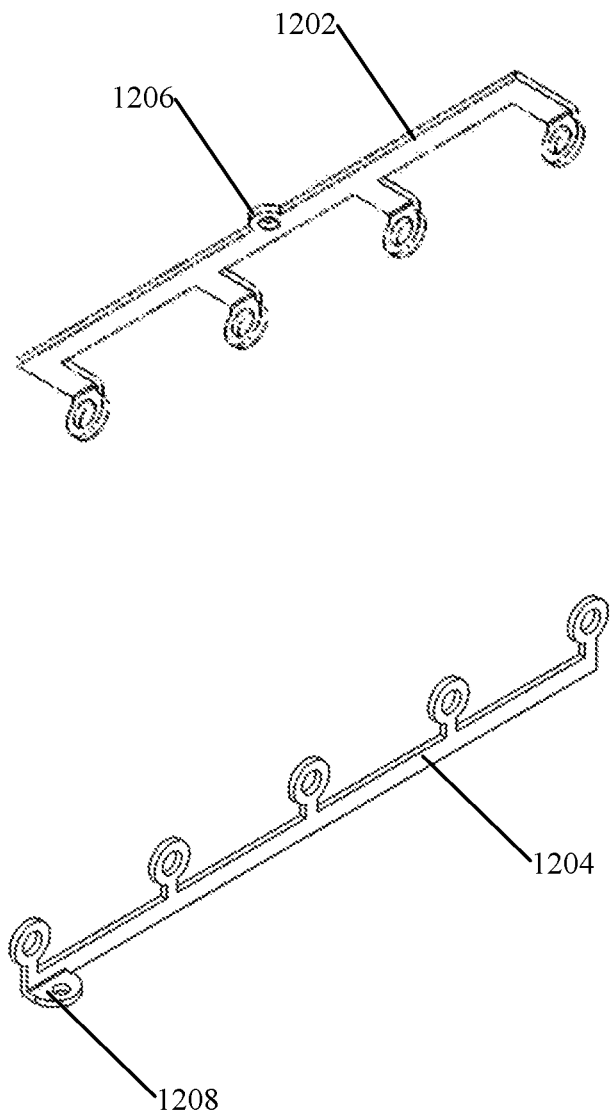
FIG. 12 is a perspective view of an upper connection brace and a lower connection brace of a fencing base in accordance with the teachings of this disclosure.

To distribute electricity, provided by the control box 104 via the conduit cable 106, the fencing base 102 incorporates an upper connection brace and a lower connection brace that are indicated at 1202 and 1204 respectively in FIG. 12. The upper connection brace 1202 incorporates an electrical connector 1206 while the lower connection brace 1204 incorporates an electrical connector 1208. The connectors 1206-1208 are connected to two power wires of the cable 106 to receive electrical power from the control box 104. A cut-away view of the fencing base 102 showing the upper connection brace 1202 and the lower connection brace 1204 is illustrated in FIG. 13.

Figure 13:
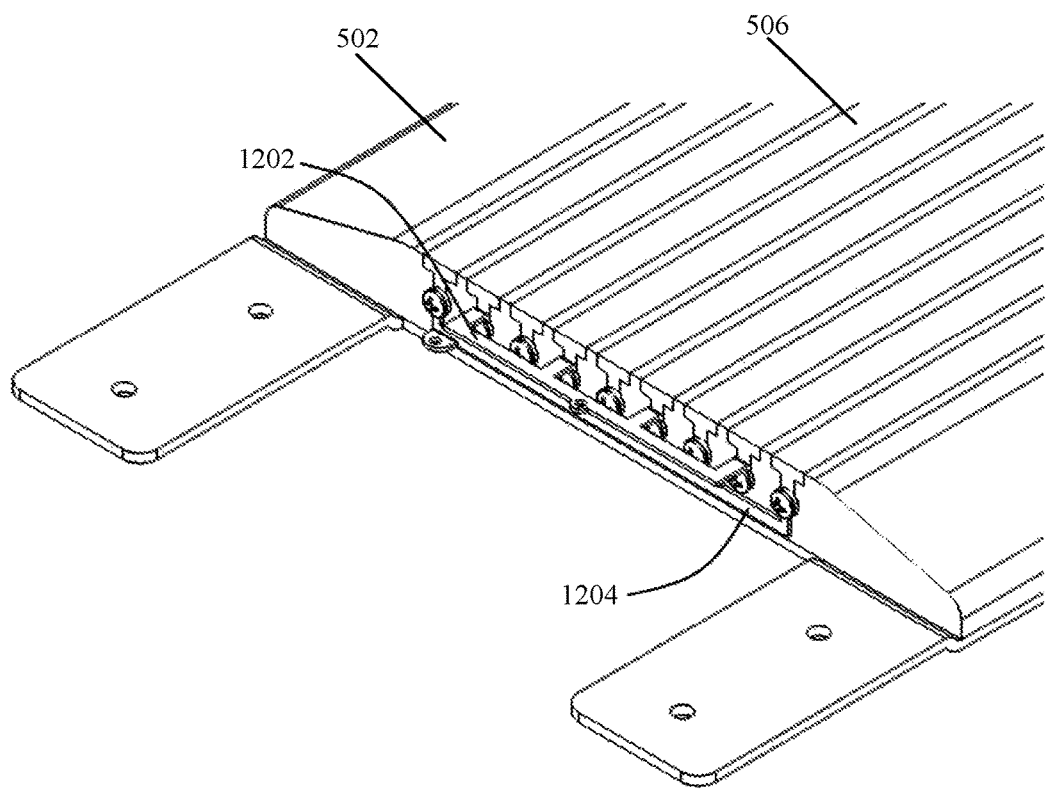
FIG. 13 is a cut-away view of a fencing base in accordance with the teachings of this disclosure.

Referring to FIG. 13, in one illustrative implementation, the fencing base 102 incorporates nine (9) fence tracks 506. In such a case, the lower connection brace 1204 is coupled and connected to five (5) fence tracks. These five fence tracks are separated by the rest four (4) fence tracks that are coupled to and connected to the upper connection brace 1202. In other words, if the fence tracks 506 are numbered in sequential orders between one and nine, the lower connection brace 1204 is connected to the odd numbered fence tracks 506 while the upper connection brace 1202 is connected to the even numbered fence tracks 506. Alternatively, the lower connection brace 1204 is connected to the even numbered fence tracks 506 while the upper connection brace 1202 is connected to the odd numbered fence tracks 506. As used herein, it is said that alternating fence tracks 506 are connected to the upper connection brace 1202 and the lower connection brace 1204 respectively; and the fence tracks 506 include two subsets of alternating fence tracks 506. One subset (meaning one or more) of fence tracks 506 is connected to the lower connection brace 1204 and the other subset of fence tracks 506 is connected to the upper connection brace 1202. In such a configuration, a circuit is completed when an animal is in contact with any two or more consecutive fence tracks 506.

The control box 104 includes a housing, a set of panel controls exposed by the housing, and an electronic system disposed within the housing. The panel controls are used to operate the electronic system. In one implementation, the electronic system receives power from an external power source of 120 Volts or 220 Volts. Alternatively, the electronic system is powered by a battery. The control box 104 incorporates one or more output ports, each of which connects to an independent fencing base, such as the bases 102 and 302. The control box 104 is further illustrated by reference to FIG. 14.

Figure 14:
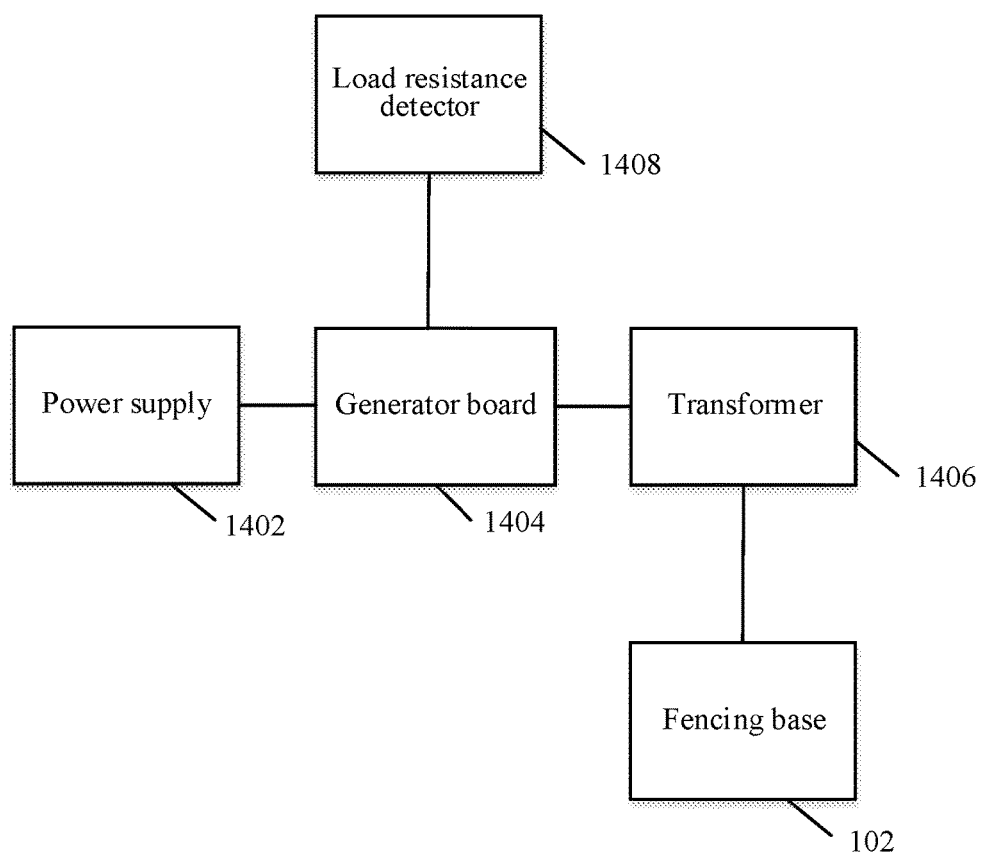
FIG. 14 is a simplified block diagram of a control box in accordance with the teachings of this disclosure.

Referring to FIG. 14, a block diagram of the control box 104 is shown. The control box 104 includes a power supply component 1402, a pulse generator board 1404, a transformer 1406 and a load resistance detector circuit 1408. In one implementation, the power supply component 1402 receives AC power from an external power source, and converts the AC power to DC power used to power the generator board 1404 and the transformer 1406. The power supply 1402 provides a regulated 12 Volts DC power to the generator board 1404. Alternatively, the power supply component 1402 is a DC circuit drawing power from a battery.

Figure 15:
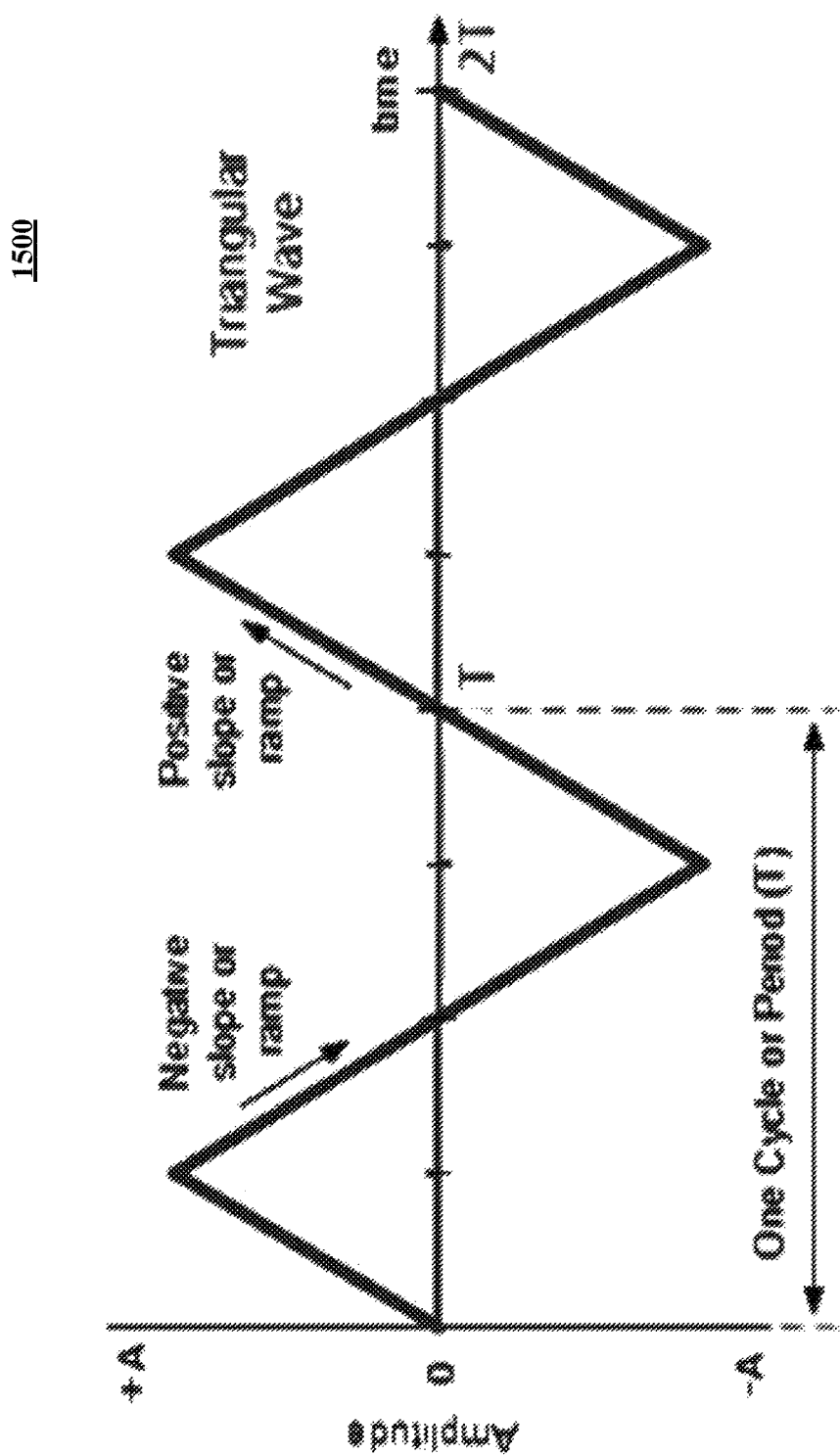
FIG. 15 is an electrical wave form in accordance with the teachings of this disclosure.

The generator board 1404 produces electrical wave form in triangular shape, as shown in FIG. 15 and indicated at 1500, to the transformer component 1406. The transformer 1406 steps-up the wave form voltage of the wave form 1500 at ratio, such as, 1:26 and steps down the current draw at a corresponding ratio of 26:1. The transformer 1406 then outputs the signal through two wires connected to the connectors 1206 and 1208 respectively. The two wire output can be split in parallel configurations to support additional fencing bases. For example, the output wires are split in parallel to form two separate ports supporting the fencing base 102 and the fencing base 302 at the same time.

Turning to FIG. 15, when the electric wave form 1500 is being generated, the control box 104 is said to be in an active pulse operation. Otherwise, the control box 104 is said to be in a halted pulse operation. In other words, the control box 104 supports an active pulse operation and a halted pulse operation, which are also referred to herein as normal and abnormal states respectively. The control box 104 determines the pulse operation mode that it operates in by reading the resistance of the grid's closed circuit when an animal or human touches two or more consecutive fence tracks 506. Table 1 below summarizes one illustrative implementation of the present teachings:

TABLE 1

| Operation Mode | Load resistance | Duration | Pulse Operation |
| --- | --- | --- | --- |
| Normal | >9000 Ohm | any | Active |
| Abnormal | <9000 Ohm | >20 seconds | Halted |
| Normal | <9000 Ohm | <20 seconds | Active |
| Normal | <50 Ohm | <3 seconds | Active |
| Abnormal | <50 Ohm | >3 seconds | Halted |

The load resistance detector 1408 detects the resistance load of the above mentioned closed circuit. When the resistance load is less than fifty (50) Ohm and this resistance load lasts more than three (3) seconds, the control box 104 operates in the halted mode, in which the wave form 1500 is not generated. This condition indicates that the base 102 is in contact with an object other than the intended target species, such as a rodent. When the resistance load on the grid is less than fifty (50) Ohm and this resistance load lasts less than three (3) seconds, the control box 104 operates in the active mode, in which the wave form 1500 is generated. When the resistance load on the grid is less than nine thousand (9000) Ohm, but more than fifty Ohm, and this resistance load lasts more than twenty (20) seconds, the control box 104 operates in the halted mode. In such a case, the base 102 is likely in a malfunction state, such as submerging in water.

When the resistance load on the grid is less than nine thousand (9000) Ohm, but more than fifty Ohm, and this resistance load lasts less than twenty (20) seconds, the control box 104 operates in the active mode. When the resistance load on the grid is more than nine thousand (9000) Ohm, the control box 104 operates in the active mode. As used herein, the three seconds mark is also referred as a first time duration threshold; the twenty seconds mark is referred to as a second time duration threshold; the 50 Ohm is referred to as a first resistance threshold; and the 9000 Ohm is referred to as a second resistance threshold.

Obviously, many additional modifications and variations of the present disclosure are possible in light of the above teachings. Thus, it is to be understood that, within the scope of the appended claims, the disclosure may be practiced otherwise than is specifically described above. For example, the first time duration threshold, the second time duration threshold, the first resistance threshold and the second resistance threshold can take different values, such as 4, 25, 60 and 9500 respectively, for optimization and customization.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A fencing system for deterring animals from entering a facility, the fencing system comprising:
   1. a control box;
   2. a first conduit cable operatively coupled to said control box;
   3. a first fencing base operatively coupled to said control box via said first conduit cable and controlled by said control box, said first fencing base adapted to prevent a first animal from entering a first facility by electric shock;
   4. wherein said first fencing base includes a pad rail having a set of fence tracks and forming an electrically conductive grid that receives power from said control box over said first conduit cable, wherein each fence track within said set of fence tracks is electrically conductive; and
   5. wherein said first fencing base includes an upper connection brace and a lower connection brace, wherein:
      i. said upper connection brace incorporates a first electrical connector connected to said control box via said first conduit cable;
      ii. said lower connection brace incorporates a second electrical connector connected to said control box via said first conduit cable;
      iii. said upper connection brace is electronically connected to a first subset of alternating fence tracks of said set of fence tracks; and
      iv. said lower connection brace is electronically connected to a second subset of alternating fence tracks of said set of fence tracks, wherein a circuit is completed when said first animal is in contact with two consecutive fence tracks, wherein one of said two consecutive fence tracks is within said first subset of alternating fence tracks and the other one of said two consecutive fence tracks is within said second subset of alternating fence tracks.

2. The fencing system of claim 1, wherein said control box includes a pulse generator board, a transformer operatively coupled to said generator board and said first fencing base, and a load resistance detector operatively coupled to said generator board and detecting a load resistance of an electrically conductive grid of said fencing base.

3. The fencing system of claim 2, wherein:
   i. said generator board produces an electrical wave form;
   ii. said transformer transforms said wave form, thereby forming a transformed signal;
   iii. said transformer outputs said signal to said first fencing base via said first conduit cable.

4. The fencing system of claim 3, wherein said wave form is in a triangular shape.

5. The fencing system of claim 3, wherein said transformer transforms said wave form by stepping-up a wave form voltage of said wave form at a first ratio and stepping-down a current draw of said wave form at a second ratio.

6. The fencing system of claim 5, wherein said first ratio is an inverse of said second ratio.

7. The fencing system of claim 3, wherein said control box operates in an active mode when:
   i. said load resistance is above a first resistance threshold;
   ii. said load resistance is below said first resistance threshold and a time duration of said load resistance is below a first time duration threshold; or
   iii. said load resistance is below a second resistance threshold and said time duration of said load resistance is below a second time duration threshold.

8. The fencing system of claim 7, wherein said first resistance threshold is 9000 ohms, said second resistance threshold is 50 ohms, said first time duration threshold is 20 seconds, and said second time duration threshold is 3 seconds.

9. The fencing system of claim 3, wherein said control box operates in a halted mode when:
   i. said load resistance is below a first resistance threshold and a time duration of said load resistance is above a first time duration threshold; or
   ii. said load resistance is below a second resistance threshold and said time duration of said load resistance is above a second time duration threshold.

10. The fencing system of claim 9, wherein said first resistance threshold is 9000 ohms, said second resistance threshold is 50 ohms, said first time duration threshold is 20 seconds, and said second time duration threshold is 3 seconds.

11. The fencing system of claim 1, wherein said first fencing base is extensible in length.

12. The fencing system of claim 11, wherein said first fencing base includes a set of floor mat extensions for extending said first fencing base.

13. The fencing system of claim 1 further comprising:
  i. a second conduit cable operatively coupled to said control box; and
  ii. a second fencing base operatively coupled to said control box via said second conduit cable and controlled by said control box, said second fencing base adapted to prevent a second animal from entering a second facility by electric shock.

14. The fencing system of claim 13, wherein said first facility is the same as said second facility.

15. The fencing system of claim 1, wherein said pad rail incorporates a set of grooves receiving said set of fence tracks.

\* \* \* \* \*